United States Patent [19]
Makihara

[11] 4,025,829  
[45] May 24, 1977

[54] SILVER MICA BLOCK CONDENSER AND METHOD OF MAKING THE SAME

[75] Inventor: Masuichi Makihara, Tokyo, Japan

[73] Assignee: Shinnitoku Denki Kabushiki Kaisha, Tokyo, Japan

[22] Filed: Dec. 10, 1975

[21] Appl. No.: 639,322

[30] Foreign Application Priority Data

Apr. 8, 1975  Japan ................. 50-42451

[52] U.S. Cl. .................. 361/305; 29/25.42; 361/311
[51] Int. Cl.² ............ H01G 4/04; H01G 1/14
[58] Field of Search ......... 317/258, 261; 29/25.42

[56] References Cited

UNITED STATES PATENTS

| | | | |
|---|---|---|---|
| 1,580,057 | 4/1926 | Lewis | 317/261 |
| 1,811,725 | 6/1931 | Marckworth | 317/261 |
| 2,972,180 | 2/1961 | Gulton | 317/261 X |
| 3,491,275 | 1/1970 | Puppolo | 317/258 |
| 3,581,167 | 5/1971 | Veater | 317/261 |

FOREIGN PATENTS OR APPLICATIONS 961,661  5/1970  France .................. 317/261

Primary Examiner—E. A. Goldberg  
Attorney, Agent, or Firm—John C. Smith, Jr.

[57] ABSTRACT

A silver mica block condenser wherein a mica plate is fitted with a plurality of silver films as spaced from one another on one surface and with a silver film on the other surface, a glass film is applied to cover the plurality of silver films and the spacings between them, a window or a bay-shaped part is made in a part of the glass film on each silver film and a solder film is applied to cover the glass film on the peripheral edge so as to be in contact with the silver film exposed from each window or to fill each bay-shaped part.

4 Claims, 8 Drawing Figures

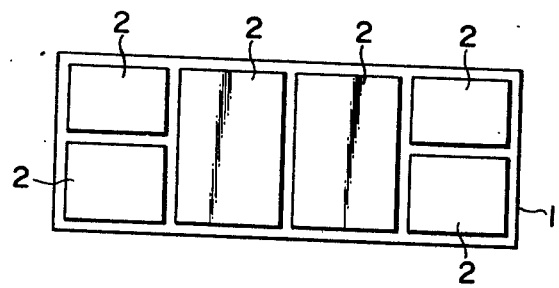
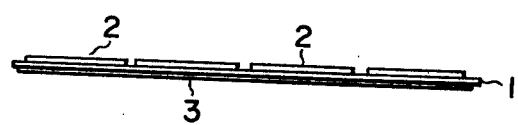
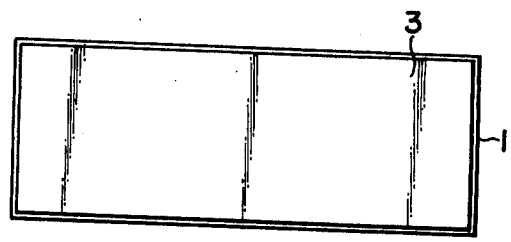
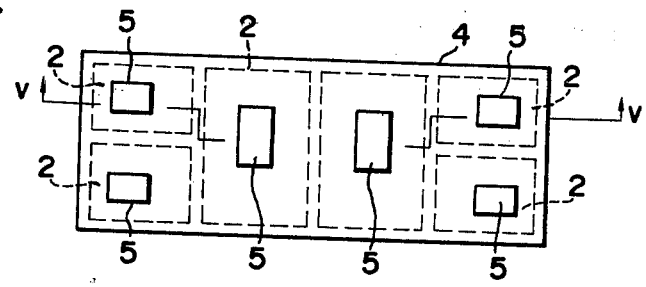
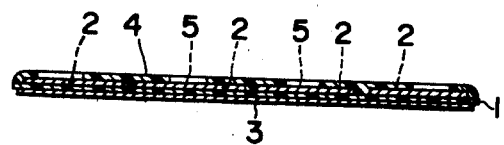

SILVER MICA BLOCK CONDENSER AND METHOD OF MAKING THE SAME

This invention relates to block condensers to be used for concentrated constant delay circuits contained in IC (integrated circuits) or DIP (durian packs). The surface to be allowed in the arrangement of this kind of condenser is a rectangle of a width of 5mm. and length of 18mm. It is required to arrange several to more than 10 condensers in this area.

In the case of forming a large capacity in such small area, if a mica plate is used as a dielectric, it will have to be so thin as to be 10 to 15 microns thick. Therefore, in the construction so far adopted for the conventional silver mica condenser, the mica plate is so thin as to be likely to be broken and that it is difficult to provide a lead leading out the electrode. Therefore, though the silver mica condenser is higher in the stability than thick film condensers and ceramic condensers already used for this kind of use, it has not been used for such use.

An object of the present invention is to provide a structure of a silver mica block condenser wherein lead wires can be electrically connected to a plurality of silver films fitted in the form of blocks on the surface of a mica plate so stably that the silver films may not peel off the mica plate.

In order to attain this object, in the present invention, by noticing that a glass film on a mica plate obtained by heating a glass frit layer fitted on the surface of the mica plate has a property of strongly bonding with the mica plate, it is made possible to make the electric connection of a lead wire to a silver film strong enough by applying a solder layer connecting the lead wire onto the glass film and connecting the solder layer and silver film with each other through an opening made in the glass film.

The drawings show an embodiment of the silver mica block condenser according to the present invention.

FIG. 1 is a view showing one surface of a mica plate fitted with silver films on the front and back surfaces.

FIG. 2 is a side view of FIG. 1.

FIG. 3 is a back view of FIG. 1.

FIG. 4 is a view showing a glass film as applied onto the silver films shown in FIG. 1.

FIG. 5 is a sectioned side view on line V—V in FIG. 4.

Figure 6:
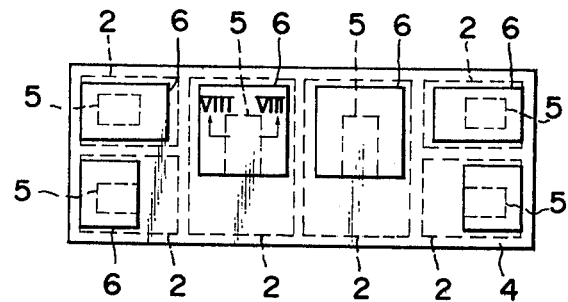
FIG. 6 is a view showing a solder film as further applied onto FIG. 4.
Figure 7:
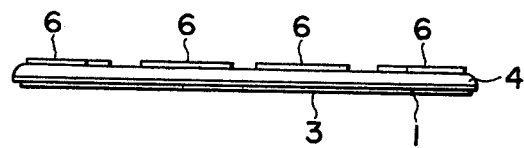
FIG. 7 is a side view of FIG. 6.

The present invention shall be explained with reference to the embodiment shown in the drawings. FIGS. 1 to 3 show silver films 2 and 3 to be electrodes as fitted on the front and back surfaces of a mica plate 1. These silver films 2 and 3 are obtained by applying a silver paste as thin layers onto each surface of the mica plate 1 and heating and baking it. The plurality of silver films 2 fitted on one surface of the mica plate 1 are separated from one another so as to be individual electrodes opposed to the silver film 3 which is a common electrode fitted on the other surface of the plate as continued entirely except on the periphery of the mica plate 1.

A glass film 4 is fitted on the above mentioned silver films 2 as shown in FIGS. 4 and 5 by applying a glass frit in the form of a thin layer and heating and backing it so as to continuously cover the plurality of silver films 2 and the surface of the mica plate 1 exposed between the silver films 2 around them and is provided with a window 5 in the position of overlapping each silver film 2 so that each silver film 2 may be exposed through the window 5.

FIGS. 6 and 5 show solder films 6 separated for the respective silver films 2 so as to cover the windows 5 and the glass film 4 around them.

Figure 8:
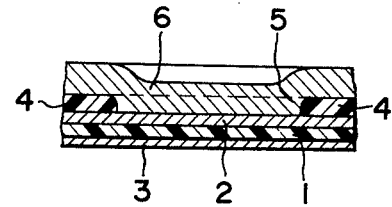
FIG. 8 is a magnified sectioned view on line VIII—VIII in FIG. 6.

FIG. 8 is a magnified sectioned view on line VIII—VIII of the part having the window 5 in FIG. 6. As clear from this drawing, the solder film 6 contacts the silver film 2 through the window 5.

The glass film 4 contacts the mica plate 1 around the silver films 2 to press them 2 so as not to peel off the mica plate 1. Therefore, in case a lead wire is connected to the solder film 6 connected with the silver film 2 through the window 5 in the glass film 4, the silver film 2 will be able to be prevented from being peeled off the mica plate 1 through the solder film 6 by an external force applied to the lead wire.

The window 5 may be formed as a bay-shaped part recessed inward in the form of a bay from the peripheral edge of the glass film 4. In such case, the solder film will not contact the silver film but there will be no problem caused thereby.

As in the above, according to the present invention, it is possible to practically use silver mica block condensers.

What is claimed is:

1. A silver mica block condenser comprising:
   a. a mica plate having surfaces on opposite sides thereof and edges about its perimeter;
   b. at least one silver film on one of said surfaces, the edges of said film about its perimeter being spaced inwardly from the edges of said mica plate leaving a peripheral portion of said one surface between the edges of said silver film and the edges of said mica plate;
   c. a glass film on said silver film and bonded to said peripheral portion of said one surface of said mica plate to retain said silver film on said one surface of said mica plate, said glass film including a window over said silver film, the peripheral edges of said window being spaced inwardly from the edges of said silver film leaving only a portion of said silver film not covered by said glass film;
   d. a solder film extending over said window and the surface of said glass film about the periphery of said window, the portion of said solder film extending over said window being depressed through said window and contacting the surface of said silver film whereby the surface of said solder film at said window is concave;
   e. a lead wire extending from said solder film; and
   f. at least one further silver film on the surface of said mica plate opposite said one surface thereof.

2. A silver mica block condenser as defined in claim 1 wherein:
   a. a plurality of said silver films are arranged on said one surface of said mica block, the edges of said silver films being spaced from each other and from edges of said mica plate leaving said peripheral portion and exposed portions of said surface of said mica plate between said silver films;
   b. said glass film on said silver films is bonded to said exposed portions of said surface of said mica plate and said peripheral portion to retain said silver films on said one surface of said mica plate, said glass film having a window over each of said silver films, the peripheral edges of each window being spaced inwardly from the peripheral edges of the respective silver film;

c. an individual solder film extends over each window and the surface of said glass film about the periphery of the window, the edges of said solder films being spaced from each other, the portion of each solder film extending over its respective window being depressed through said window and contacting the surface of the respective silver film; and d. a lead wire extending from each of said solder films.

3. A silver mica block condenser as defined in claim 2 wherein a plurality of said further silver films are positioned on the surface of said mica plate opposite said one surface, said further silver films being located at positions substantially corresponding to the plurality of silver films on said one side of said mica plate.

4. A method of manufacturing a silver mica block condenser comprising:

a. applying a plurality of silver films in the form of a silver paste on one surface of a mica plate and at least one further silver film in the form of a silver paste on the surface of said mica plate opposite said one surface thereof, the edges of said silver films on said one surface being spaced from each other and from the edges of said mica plate leaving an exposed peripheral portion of said one surface between the edges of said silver films and the edges of said mica plate and exposed portions of said surface of said mica plate between said silver films;

b. heating and baking said mica plate with said silver films to bond said silver films thereto;

c. applying a glass film in the form of glass frit on said silver films and said portions of said surface of said mica plate, said glass film having a window over each of said silver films, the peripheral edges of each window being spaced inwardly from the peripheral edges of the respective silver film;

d. heating and baking said mica plate with said silver films and glass film to bond said glass film to said exposed portions of said one surface of said mica plate to retain said silver films on said one surface of said mica plate;

e. applying an individual solder film over each window and the surface of said glass film about the periphery of the window, the edges of said solder films being spaced from each other, the portion of each solder film extending over its respective window being depressed through said window and contacting the surface of the respective silver film; and f. attaching a lead wire to each of said solder films.

* * * * *